United States Patent
Sakata

(10) Patent No.: US 10,620,155 B2
(45) Date of Patent: Apr. 14, 2020

(54) BIOSENSOR AND MOLECULAR IDENTIFICATION MEMBER

(71) Applicant: THE UNIVERSITY OF TOKYO, Tokyo (JP)

(72) Inventor: Toshiya Sakata, Tokyo (JP)

(73) Assignee: The University of Tokyo, Tokyo (JP)

( * ) Notice: Subject to any disclaimer, the term of this patent is extended or adjusted under 35 U.S.C. 154(b) by 169 days.

(21) Appl. No.: 14/787,414

(22) PCT Filed: Mar. 17, 2014

(86) PCT No.: PCT/JP2014/057198
§ 371 (c)(1),
(2) Date: Oct. 27, 2015

(87) PCT Pub. No.: WO2014/178237
PCT Pub. Date: Nov. 6, 2014

(65) Prior Publication Data
US 2016/0069834 A1 Mar. 10, 2016

(30) Foreign Application Priority Data
Apr. 30, 2013 (JP) .................................. 2013-095988

(51) Int. Cl.
*G01N 27/414* (2006.01)
*G01N 27/327* (2006.01)
*G01N 27/416* (2006.01)

(52) U.S. Cl.
CPC ..... *G01N 27/4145* (2013.01); *G01N 27/3275* (2013.01); *G01N 27/4166* (2013.01)

(58) Field of Classification Search
CPC ........... G01N 27/4145; G01N 27/3275; G01N 27/4166
See application file for complete search history.

(56) References Cited

U.S. PATENT DOCUMENTS 4,437,969 A   3/1984 Covington et al.
6,063,637 A   5/2000 Arnold et al.
(Continued)

FOREIGN PATENT DOCUMENTS

EP   2518482 A1   10/2012
JP   08-338798    12/1996
(Continued)

OTHER PUBLICATIONS

A. Matsumoto, et al., "Glucose-sensitive field effect transistor using totally synthetic compounds" Journal of Solid State Electrochemistry, vol. 13, p. 165-170. (Year: 2009).*
(Continued)

*Primary Examiner* — J. Christopher Ball
(74) *Attorney, Agent, or Firm* — Myers Bigel, P.A.

(57) ABSTRACT

[Problem to be Solved] Provided is a higher sensitive biosensor, in which a trace amount of non-invasively collected body fluid sample can be used, and even in a case where such a trace amount of sample is used, or even in a case where the concentration of an object substance to be measured in a sample is low, the object substance can be measured with high accuracy. [Solution] A biosensor 100 for measuring an object substance contained in a body fluid comprises: a molecule identification member 110 which is permeable to the body fluid, and has a molecule identification element 113 that can interact with the object substance contained in the permeated body fluid; and a detection element 120, which is connectable with the molecule identification member 110, and detects a change generated as a result of the interaction of the molecule identification element 113 with the object substance.

14 Claims, 7 Drawing Sheets

(56) References Cited

U.S. PATENT DOCUMENTS

| | | | |
|---|---|---|---|
| 7,368,085 B2* | 5/2008 | Gu | G01N 33/66 257/1 |
| 8,344,733 B2 | 1/2013 | Nakamura et al. | |
| 8,394,247 B2 | 3/2013 | Kamahori et al. | |
| 8,668,871 B2 | 3/2014 | Matsumoto et al. | |
| 8,669,124 B2 | 3/2014 | Merz | |
| 2003/0186773 A1 | 10/2003 | Iwazaki et al. | |
| 2009/0014757 A1 | 1/2009 | Takulapalli et al. | |
| 2010/0137143 A1 | 6/2010 | Rothberg et al. | |
| 2010/0194409 A1* | 8/2010 | Gao | C12Q 1/6825 324/693 |
| 2012/0088990 A1 | 4/2012 | Bunge et al. | |
| 2012/0244037 A1* | 9/2012 | Matsumoto | C07F 5/025 422/69 |
| 2012/0247976 A1 | 10/2012 | Yan et al. | |

FOREIGN PATENT DOCUMENTS

| | | |
|---|---|---|
| JP | 2000510233 A | 8/2000 |
| JP | 2003287062 A | 10/2003 |
| JP | 2008-134255 | 6/2008 |
| JP | 2008527392 A | 7/2008 |
| JP | 2010-107496 A | 5/2010 |
| JP | 2010-164513 | 7/2010 |
| JP | 2010-243301 | 10/2010 |
| JP | 2012026839 A | 2/2012 |
| JP | 2012053061 A | 3/2012 |
| JP | 2012-070907 A | 4/2012 |
| JP | 2013-027623 A | 2/2013 |
| TW | 201011290 A | 3/2010 |
| WO | WO 97/41425 A1 | 11/1997 |
| WO | WO 2005015193 A1 | 2/2005 |
| WO | WO 2006/078224 A1 | 7/2006 |

OTHER PUBLICATIONS

A. Matsumoto, et al., "Chemical-to-Electrical-Signal Transduction Synchronized with Smart Gel Volume Phase Transition" Advanced Materials, vol. 21, p. 4372-4378. (Year: 2009).*

Y. Maeda, et al. "Preparation of a-mannoside hydrogel and electrical detection of saccharide-protein interactions using the smart gel-modified gate field effect transistor" Nanoscale Research Letters, 7(1): paper # 108, 8 pgs., Dec. 2012.*

T. Goda, et al. ("Detection of Microenvironmental Changes Induced by Protein Adsorption onto Self-Assembled Monolayers using an Extended Gate-Field Effect Transistor", Analytical Chemistry, 82(5): p. 1803-1810, Mar. 2010.*

Office Action corresponding to Japanese Application No. 2013-095988 dated Jul. 2, 2013.

Office Action corresponding to Taiwanese Application No. 10321731260 dated Dec. 11, 2014.

Springsteen et al. "A detailed examination of boronic acid-diol complexation", *Tetrahedron* 58:5291-5300 (2002).

Extended European Search Report corresponding to European Application No. 14835100.0 dated Feb. 22, 2017.

Uematsu et al. "Development of glucose transistor for highly sensitive detection of glucose in biogenic fluid", *Japan Society of Applied Physics and Related Societies* p. 12-174, 28p-G17-4 (Mar. 28, 2013) (2 pages in English).

Office Action corresponding to Japanese Application No. 2013-165086 dated Dec. 12, 2013.

Reinhoudt et al. "The Transduction of Host-Guest Interactions into Electronic Signals by Molecular Systems", Advanced Materials 2(1):23-32 (1990).

U.S. Appl. No. 14/907,934; Office Action dated Oct. 25, 2017.

U.S. Appl. No. 14/907,934; Office Action dated Apr. 16, 2018.

U.S. Appl. No. 14/907,934; Office Action dated Sep. 27, 2018.

Moussy et al. "Performance of Subcutaneously Implanted Needle-Type Glucose Sensors Employing a Novel Trilayer Coating", Anal. Chem. 65:2072-2077 (1993).

U.S. Appl. No. 14/907,934; Office Action dated Dec. 2, 2019.

Harrison et al, "Characterization of Perfluorosulfonic Acid Polymer Coated Enzyme Electrodes and a Miniaturized Integrated Potentiostat for Glucose Analysis in Whole Blood", Anal. Chem. 60:2002-2007 (1988).

* cited by examiner

[Figure 1]
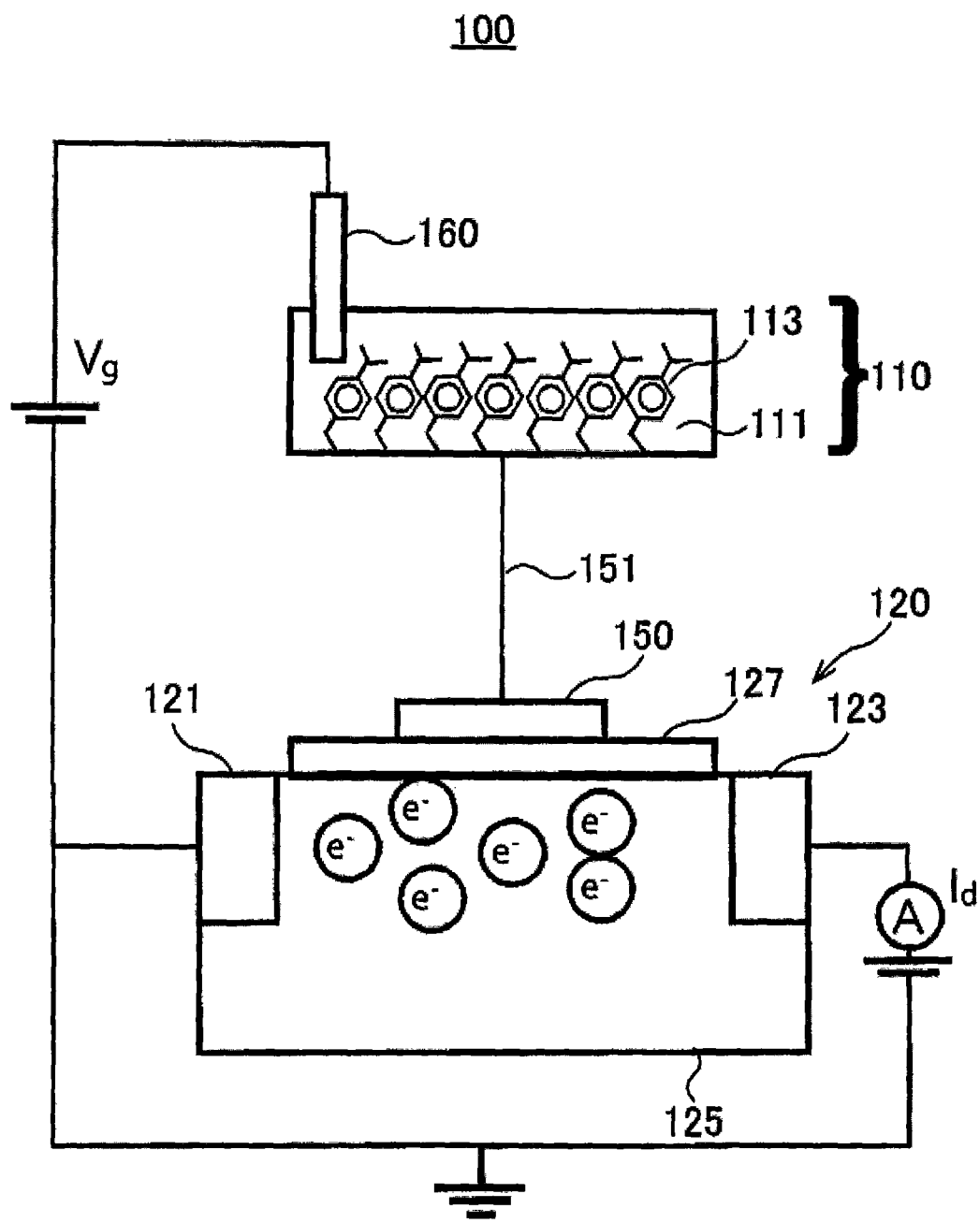

[Figure 2]
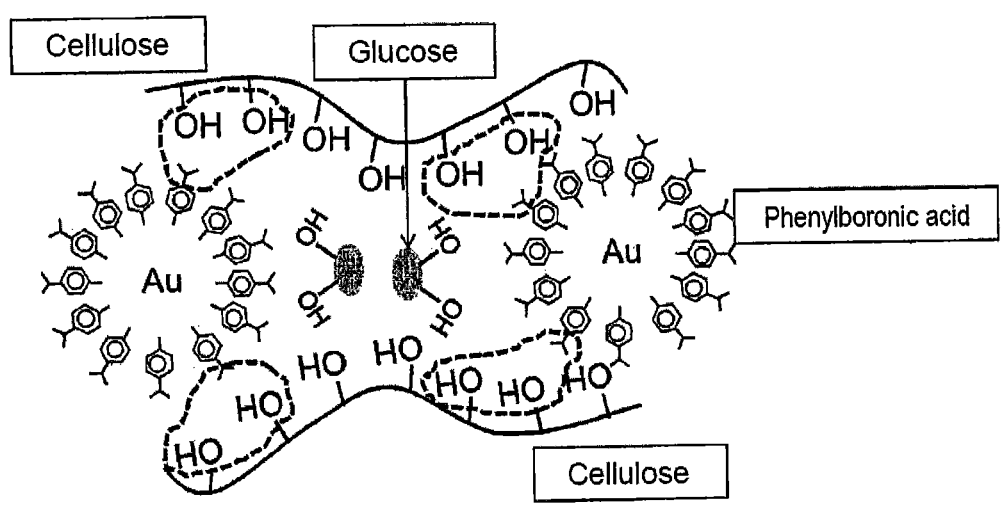

[Figure 3]
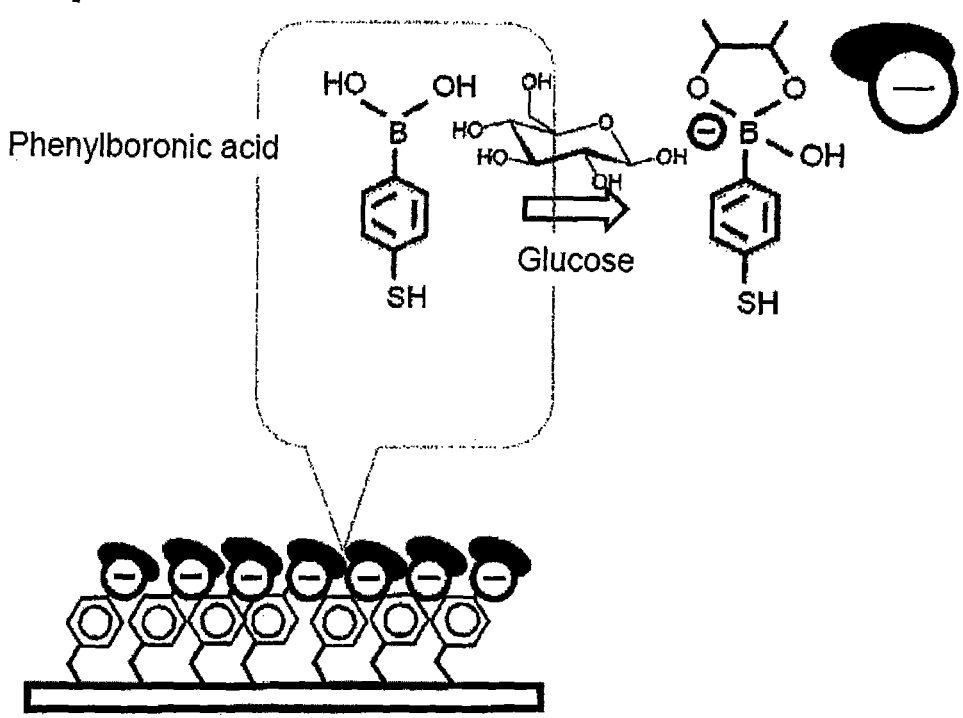

[Figure 4]
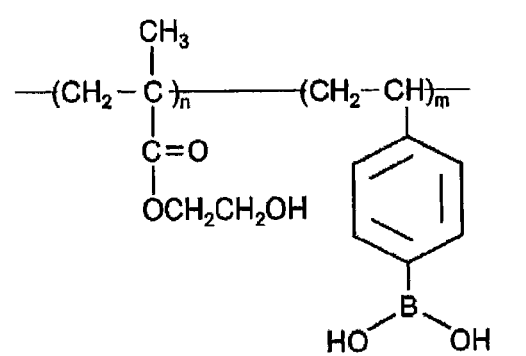
2-Hydroxyethyl methacrylate (HEMA)
C6H10O3
p-Vinylphenylboronic acid

[Figure 5]
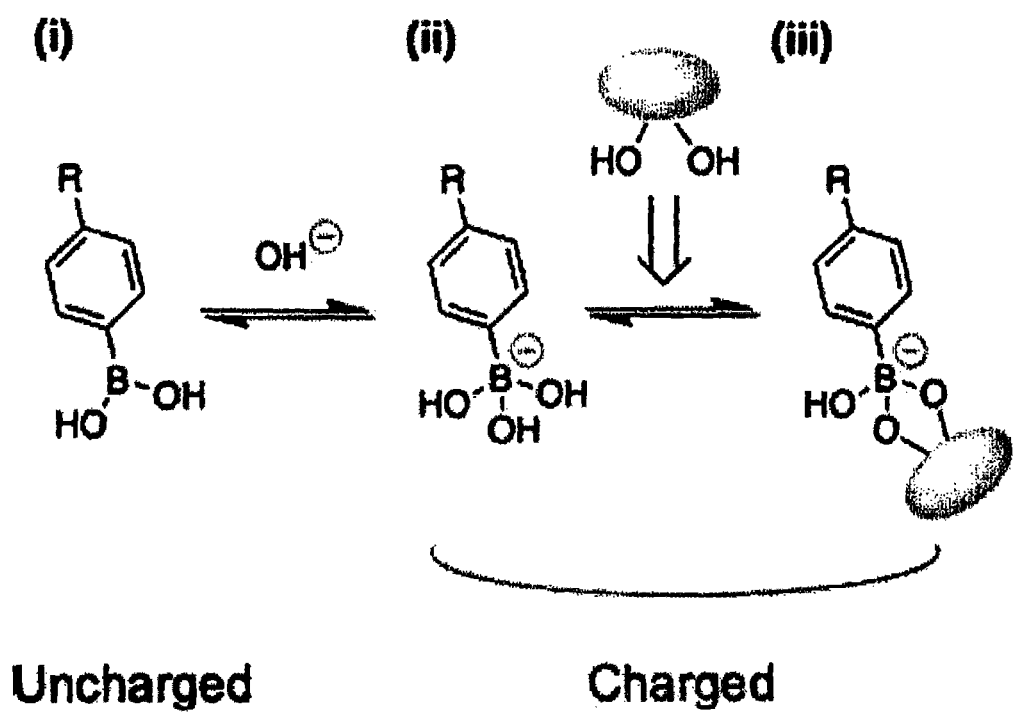

[Figure 6]
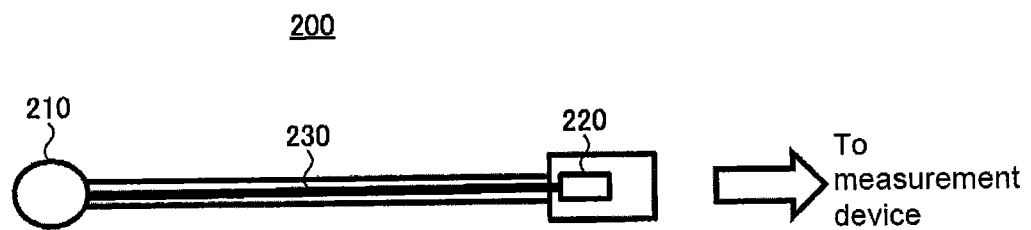

[Figure 7]
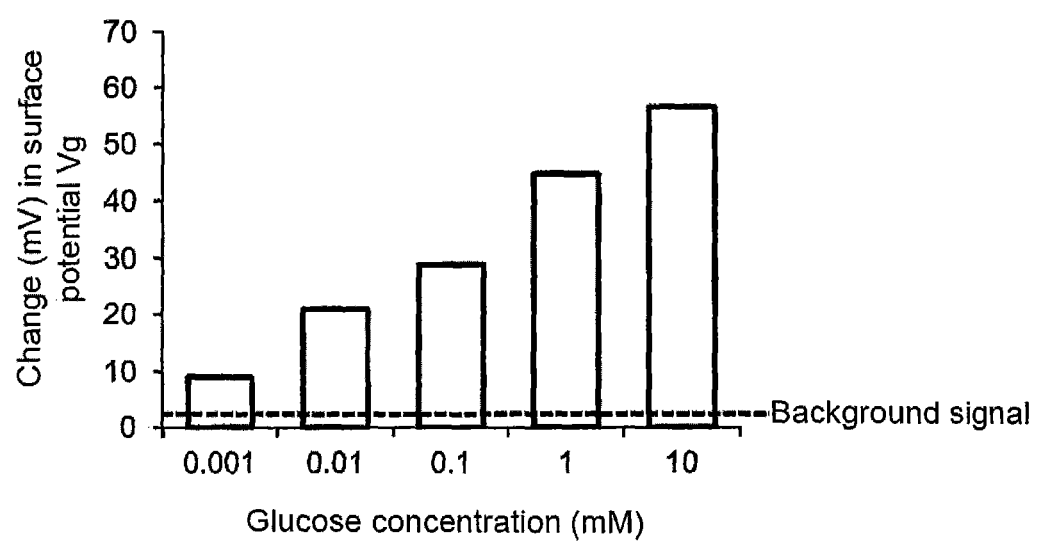

BIOSENSOR AND MOLECULAR IDENTIFICATION MEMBER

RELATED APPLICATIONS

This application is a 35 U.S.C. § 371 national phase application of PCT Application PCT/JP2014/057198 filed Mar. 17, 2014 which claims priority to Japanese Application No. 2013-095988 filed Apr. 30, 2013. The entire content of each is incorporated herein by reference in its entirety.

TECHNICAL FIELD

The present invention relates to a biosensor, and particularly to a biosensor which uses a field effect transistor and in which a component contained in a body fluid is used as an object to be measured.

BACKGROUND ART

In recent years, various biosensors have been studied and developed, and have been used in the field of medical services, drug discovery, clinical inspections, and the like. Such a biosensor recognizes external information (e.g., chemical elements) as a certain physical signal by utilizing the excellent molecule identification ability of an organism, and thus, involves various principles and objects to be measured. More specifically, the biosensor is one type of chemical sensor having a chemical substance as an object to be measured, and is composed of a molecule identification element that recognizes only an object substance to be measured, and a signal conversion element that converts the recognized information into a physical signal such as an electrical signal. In general, the molecule identification element uses a biomolecule such as enzyme, antibody, DNA, cell or microorganism, or a compound that captures such a biomolecule, and thus it is referred to as a "biosensor."

Moreover, as a signal conversion element, a common electronic device or chemical sensor, such as an electrode, a thermistor, a quartz crystal, surface plasmon resonance or a semiconductor element, is used. Recently, a biosensor, in which a field effect transistor (FET) is used, has been vigorously studied. In the biosensor using FET, when the molecule identification element recognizes a chemical substance that is an object to be measured, a physical change such as heat, mass and electric charge, or a chemical change such as decomposition of an object substance and generation of a substance occurs. The change is converted into an electrical signal by FET serving as a signal conversion element, and the object substance is measured. The biosensor using FET has the following characteristics: (1) it can electrically detect an electric charge that is specific to an ion or a molecule; (2) it does not need time and effort before measurement; (3) it enables a real-time measurement; (4) it enables a non-labeled, non-invasive electrical measurement; and (5) it enables miniaturization and integration according to a microfabrication technique for semiconductors.

A technique of applying such a biosensor using FET to a method for non-invasively analyzing living cells has been proposed (see, for example, Patent Literature 1). This biosensor described in Patent Literature 1 has a structure in which a detection surface for detecting a change in physical properties such as a negative charge is coated with a phenylboronic acid group binding to a sialic acid sample (a cell itself or a sugar chain derived from the cell). It is considered that this biosensor is able to provide: a non-invasive, easily usable real-time cytoscreening tool that does not use a label such as a fluorescence, which has been impossible by conventional sugar chain analysis methods; and a method of detecting the sugar chain of a cell of interest by using the real-time cytoscreening tool.

CITATION LIST

Patent Literature

[Patent Literature 1] Japanese Patent Laid-Open No. 2010-107496

SUMMARY OF INVENTION

Technical Problem

By the way, when a component contained in a body fluid is measured for the diagnosis of disease or determination of therapeutic strategy, a measurement method capable of measuring an object substance with high accuracy has been required, even in a case where a trace amount of sample is used, from the viewpoint of a reduction in a burden on a patient, simplification of sampling, etc. Moreover, among non-invasively collected body fluid samples, there may be a case where the concentration of an object substance to be measured in the sample is low. It is desired to carry out a high-accuracy measurement even in such a case. Accordingly, a higher sensitive biosensor is required.

However, the term "non-invasive" is used in the technique described in the above Patent Literature 1 to mean that there is no invasiveness to cells and the like (for example, no burden may be given to cells and the like, and external elements may not be added thereto), and it does not mean that the body of a patient is not damaged from the viewpoint of a reduction in a burden on a patient or the like (for example, blood may not be collected from a patient, etc.). That is to say, it cannot be said that a non-invasive measurement is taken into account for a reduction in a burden on a patient, simplification of sampling, etc. in the technique described in Patent Literature 1.

Furthermore, in the technique described in the above Patent Literature 1, a technique of measuring an object substance contained in a body fluid with high accuracy when a trace amount of sample is used or when the concentration of an object substance to be measured in a sample is low is not particularly taken into account.

Hence, the present invention has been made under the aforementioned circumstances, and it is an object of the present invention to provide a higher sensitive biosensor, in which a trace amount of non-invasively collected body fluid sample can be used, and even in a case where such a trace amount of sample is used, or even in a case where the concentration of an object substance to be measured in a sample is low, the object substance can be measured with high accuracy.

Solution to Problem

As a result of intensive studies directed towards achieving the aforementioned object, the present inventors have found that the provision of a molecule identification member having a molecule identification element that can interact with an object substance to be measured, and a detection element which is connectable with this molecule identification member and detects a change generated as a result of the interaction of the object substance to be measured with the molecule identification element, and use of the molecule identification member which is permeable to a body fluid allow for the measurement of the object substance with high accuracy, even if a trace amount of non-invasively collected body fluid sample or a body fluid sample comprising a low concentration of object substance to be measured is used, and thus, based on these findings, the inventors have completed the present invention.

Specifically, the present invention relates to a biosensor for measuring an object substance contained in a body fluid, comprising: a molecule identification member which is permeable to the body fluid, and has a molecule identification element that can interact with the object substance contained in the permeated body fluid; and a detection element which is connectable with the molecule identification member, and detects a change generated as a result of the interaction.

In the biosensor, preferably, the molecule identification member further has flexibility.

In the biosensor, preferably, the molecule identification member is detachably connected with the detection element.

In the biosensor, the detection element has a semiconductor substrate provided with a first electrode and a second electrode, and an insulator placed on the surface of a portion sandwiched between the first electrode and the second electrode of the semiconductor substrate, and the molecule identification member may be connected with the semiconductor substrate via the insulator.

In the biosensor, the molecule identification element is a substance which reacts with the object substance to change at least one of charge density and capacitance in the molecule identification member, the detection element detects, as a potential change, a change in at least one of the charge density and the capacitance in the molecule identification member, and based on the potential change detected by the detection element, the object substance may be quantified.

In the biosensor, the object substance may be glucose.

In this case, the molecule identification element may be phenylboronic acid, glucose-binding protein (GBP) or a derivative thereof.

In the biosensor, the body fluid may be tear, sweat, saliva or snivel.

Moreover, the present invention relates to a molecule identification member which is permeable to a body fluid, has a molecule identification element that can interact with an object substance contained in the permeated body fluid, and is connectable with a detection element that detects a change generated as a result of the interaction.

Preferably, the molecule identification member further has flexibility.

In the molecule identification member, the molecule identification element may be a substance which reacts with the object substance to change at least one of charge density and capacitance in the molecule identification member.

In the molecule identification member, the object substance may be glucose.

In this case, the molecule identification element may be phenylboronic acid, glucose-binding protein (GBP) or a derivative thereof.

In the molecule identification member, the body fluid may be tear, sweat, saliva or snivel.

The molecule identification member may be used in a biosensor for measuring the object substance contained in the body fluid.

Advantageous Effects of Invention

According to the present invention, it becomes possible to provide a higher sensitive biosensor, in which a trace amount of non-invasively collected body fluid sample can be used, and even in a case where such a trace amount of sample is used, or even in a case where the concentration of an object substance to be measured in a sample is low, the object substance can be measured with high accuracy.

BRIEF DESCRIPTION OF DRAWINGS

FIG. 1 is a schematic view showing a general configuration of a glucose sensor as an example of the biosensor according to the present embodiment.

FIG. 2 is a schematic view showing an example of a state in which a molecule identification element is fixed on the surface of a base material of a molecule identification member.

FIG. 3 is a schematic view showing an example of a state in which the molecule identification element shown in FIG. 2 is adsorbed on a fixing substance.

FIG. 4 is a schematic view showing another example of a state in which a molecule identification element is fixed on the surface of a base material of a molecule identification member.

FIG. 5 is a view showing an example of the reaction mechanism of the molecule identification element according to the present embodiment with an object substance in a body fluid.

FIG. 6 is a schematic view showing a general configuration of a modification example of the molecule identification member according to the present embodiment.

FIG. 7 is a graph showing the results obtained by evaluating the glucose concentration responsiveness of the biosensor according to the examples of the present invention.

DESCRIPTION OF EMBODIMENTS

Hereinafter, referring to the drawings, the preferred embodiments of the present invention will be described in detail. It is to be noted that the constitutional elements having identical symbols in the present description and drawings have substantially identical structures or functions.

The biosensor according to the present embodiment will be described in the following order.
1. Configuration of biosensor
2. Method for producing biosensor
3. Intended use and usage of biosensor
4. Modification examples

[Configuration of Biosensor]

First, referring to FIG. 1, as an example of the biosensor according to the present embodiment, a glucose sensor in which the object substance to be measured is glucose will be used, and the configuration of the glucose sensor will be described. FIG. 1 is a schematic view showing a general configuration of a glucose sensor 100 that is an example of the biosensor according to the present embodiment. In the following description, there is used, as an example, a case where glucose is used as an object substance to be measured and what is called extended-gate FET is used as a detection element. However, the biosensor according to the present invention is not limited to this example. For example, an ordinary FET, in which an object to be measured is fixed on an insulating film, may also be used as a detection element.

As shown in FIG. 1, the glucose sensor 100 is a biosensor for measuring an object substance contained in a body fluid (in the present example, the object substance to be measured is glucose), using FET as a detection element, and the glucose sensor 100 mainly comprises a molecule identification member 110 and a detection element 120.

(Object Substance)

As described above, glucose is used as an object substance to be measured in the glucose sensor 100. However, the object substance used in the biosensor according to the present embodiment is not limited to glucose. The available object substance is not limited to glucose, as long as it is a component contained in a non-invasively collectable body fluid. Examples of such an object substance may include metabolites from amino acids, biochemical oxygen demands (BOD), antigens, DNAs, and cells.

Moreover, the body fluid containing such an object substance is not particularly limited, as long as it is a non-invasively collectable body fluid. When the object substance is glucose, examples of the body fluid that can be used include tear, sweat, saliva, and snivel.

(Molecule Identification Member 110)

The molecule identification member 110 is a member that is permeable to the body fluid, and has a molecule identification element 113 that can interact with the object substance contained in the permeated body fluid (the object substance to be measured by the glucose sensor 100). Furthermore, in the present embodiment, the molecule identification member 110 is connectable with a detection element 120. More specifically, the molecule identification member 110 is connected with a semiconductor substrate 125 via an insulating film 127 as described later, to have a role as a gate electrode in FET. This molecule identification element 110 has, for example, a base material 111 and a molecule identification element 113 added to the base material 111.

<Base Material 111>

The base material 111 is a member for fixing the molecule identification element 113. This base material 111 is formed from a material that is permeable to a body fluid. Even in a case where only a trace amount of body fluid containing an object substance can be collected, since the base material 111 is formed from a material that is permeable to the body fluid, such a trace amount of body fluid sample can be easily collected. The expression "the base material 111 which is permeable to a body fluid" is used in the present embodiment to mean that the base material 111 has a property that enables absorption of a body fluid therein and retention of at least a portion of the absorbed body fluid. The ability of the base material 111 to retain a body fluid is not particularly limited. The base material 111 can preferably retain a body fluid in a trace amount that is larger than the amount of a body fluid sample (e.g., approximately 0.1 µL to 1 µL) necessary for the measurement by a biosensor (which is the glucose sensor 100 in the present embodiment).

Herein, the base material 111 preferably has flexibility. Since the base material 111 has flexibility, when a body fluid such as tear, sweat, saliva, or snivel is non-invasively collected, damage to the collected site (for example, an eyeball, skin, mucosa, etc., existing in the periphery of an eye, at the armpit, in the oral cavity, etc.) is prevented, or irritation or the like is reduced, so that a body fluid can be more safely collected. Accordingly, in order to have "flexibility" in the present embodiment, it is preferable that the base material have flexibility to such an extent that it cannot only be bended, but it also can prevent damage to an eyeball, skin, mucosa, etc., and can reduce irritation or the like.

In addition, from the viewpoint of preventing damage to an eyeball, skin, mucosa, etc. or reducing irritation or the like, the base material 111 preferably has biocompatibility. The term "biocompatibility" is used herein to mean a property that does not cause interaction between the raw material for the base material 111 and a living body, or the local reaction and systemic reaction of biological tissues adjacent to the raw material for the base material 111. Accordingly, for example, when the raw material for the base material 111 has no interference with a human body and thus is harmless, or when the raw material does not interfere with (does not affect) a human body (skin, mucosa, etc.), it can be said that the base material has biocompatibility.

The raw material applicable to the base material 111 having the above-described properties is not particularly limited, as long as it is a raw material that is permeable to a body fluid. Examples of the raw material include a hydrophilic polymer and a raw material having a liquid-absorbing property.

<<Hydrophilic Polymer>>

The hydrophilic polymer used herein is a polymer having a hydrophilic functional group (a hydroxyl group, a carboxyl group, etc.). Examples of such a hydrophilic polymer include a paper, hydrogel, and a superabsorbent polymer (SAP).

Paper is produced by agglutinating fibers such as plant fibers or other fibers. The plant fibers that are raw materials for paper comprise cellulose as a main component. More specifically, cellulose is composed of cellulose, hemicellulose, and lignin. Cellulose plays a role as a skeleton, hemicellulose plays a role in the binding of skeletons, and lignin plays a role in filling voids. Cellulose has the property of binding a large number of hydroxyl groups via hydrogen bonds, and thereby, plant fibers that constitute a paper can be attached to one another. Moreover, examples of other fibers include a mineral, a metal, and a synthetic resin, which are each processed into a fibrous form. From the viewpoint of achieving the aforementioned biocompatibility, and also from the viewpoint of the stronger fixation of the after-mentioned molecule identification element 113, as a raw material for the base material 111, a paper consisting of plant fibers (cellulose) is preferable.

Hydrogel is a gelatinous raw material, which retains a large amount of water as a result of crosslinking between hydrophilic polymer chains and is excellent in terms of water absorbability. Hydrogel is a preferred raw material from the viewpoint of allowing the base material 111 to have biocompatibility and enhancing safety to human bodies (preventing damage to an eyeball, skin, mucosa, etc., or reducing irritation or the like). It is to be noted that hydrogel having a Young's modulus of approximately several hundreds of Pa is preferably used as a raw material for the base material 111.

Examples of such hydrogel include polyhydroxyethyl methacrylate (Poly-HEMA, which is also referred to as 2-hydroxyethyl polymethacrylate), polyvinylpyrrolidone (PVP), and polyvinyl alcohol (PVA). Poly-HEMA may be either a homopolymer of hydroxyethyl methacrylate (HEMA), or a copolymer with another monomer (e.g., 2,3-dihydroxypropyl methacrylate, glycerol methacrylate (GMA), etc.). Poly-HEMA tends to have a higher water content, when it is converted to a copolymer. Moreover, PVP may be either a homopolymer of N-vinyl-2-pyrrolidone (NVP), or a copolymer formed by adding HEMA, methyl methacrylate (MMA) or the like, and a crosslinking agent to NVP used as a main component, and then polymerizing the mixture. Since such hydrogel is a raw material having biocompatibility, which has also been used as a raw material for contact lens, its safety is sufficiently guaranteed, for example, when tear is collected as a body fluid sample. Accordingly, there is no problem even if the molecule identification member 110 using hydrogel is, for example, allowed to directly come into contact with an eyeball.

SAP is a polymer capable of absorbing and retaining water having a weight that is several hundreds of times to approximately thousand times higher than the weight of SAP. In addition, an acrylic acid polymer has extremely high hydrophilicity because it has a large number of carboxyl groups, and when the acrylic acid polymer is crosslinked with a network structure so to be in the form of a sodium salt, it becomes gel having high water absorbability and thus exhibits excellent properties. Hence, at present, sodium polyacrylate has been principally used as SAP. Such SAP is a raw material having biocompatibility, which has also been used as a water absorber for diapers, sanitary goods, etc. Accordingly, the safety of SAP is sufficiently guaranteed, when a body fluid sample is collected.

Examples of other hydrophilic polymers useful as raw materials for the base material 111 include: cellulose derivatives such as hydroxypropylmethyl cellulose (HPMC), carboxymethyl cellulose sodium (CMC-Na), and hydroxyethyl cellulose (HEC); polysaccharides such as alginic acid, hyaluronic acid, agarose, starch, dextran and Pullulan, and the derivatives thereof; homopolymers such as a carboxyvinyl polymer, polyethylene oxide, poly(meth)acrylamide and poly(meth)acrylic acid, copolymers of the homopolymers with polysaccharides and the like, and copolymers of monomers constituting the homopolymers with other monomers; proteins such as collagen and gelatin, and the derivatives thereof; glycosaminoglycans such as heparin, hyaluronic acid, chondroitin sulfate, dermatan sulfate, dextran sulfate, keratan sulfate and heparan sulfate, and polysaccharides and mucopolysaccharides such as chitin and chitosan.

Furthermore, as raw materials for the base material 111, there may be used hydrophilic polymers having biocompatibility, such as 1-vinyl-2-pyrrolidinone, propenoic acid 2-methyl ester, monomethacryloyloxy ethyl phthalate, ammonium sulfatoethyl methacrylate, N-vinylpyrrolidone, N,N-dimethylacrylamide, and 2-(methacryloyloxyethyl)-2-(trimethylammonioethyl)phosphate.

The above-exemplified hydrophilic polymers may be used alone, or in combination of two or more thereof.

<<Raw Material Having Liquid-absorbing Property>>

The raw material having a liquid-absorbing property used herein is a raw material having a liquid absorbing performance, which does not belong to the aforementioned hydrophilic polymer. Examples of such a raw material having a liquid-absorbing property include silica gel, water-absorbable rubber, water absorbable foamed plastic, cotton, nonwoven fabric, woven fabric, and fiber.

<<Preferred Raw Materials>>

Among the above described various types of raw materials, those having at least one of flexibility and biocompatibility are preferably used as raw materials for the base material 111, and further, those having both flexibility and biocompatibility are more preferably used as raw materials for the base material 111. Using the aforementioned raw materials as raw materials for the base material 111, it becomes possible to allow the molecule identification member 110 as a whole to have flexibility and/or biocompatibility.

<<Others>>

When the after-mentioned molecule identification element 113 itself is a polymer and consists of a material that is permeable to a body fluid, it is not always necessary to provide the base material 111. In this case, the molecule identification element 113 also has the aforementioned properties of the base material 111.

<Molecule Identification Element 113>

The molecule identification element 113 is fixed on one surface of the molecule identification member 110 (for example, a surface on the side opposite to the side that is connected with the after-mentioned semiconductor substrate 125), and has the function of identifying an object substance contained in a body fluid. The term "identify" is used herein to mean that the molecule identification element 113 interacts with the object substance, to cause a physical change such as heat, mass, electric charge and the refractive index of light, or a chemical change such as decomposition of the object substance and generation of a substance. Moreover, an example of the "interaction" can be a reaction mode in which the molecule identification element reacts with an object substance such as glucose to induce an electric charge. Specific examples of such an interaction include the binding of diols, coordinate bonds, DNA hybridization, antigen-antibody reaction, and physical adsorption. In the glucose sensor 100 according to the present embodiment, a substance which reacts with an object substance in a body fluid sample to generate an electric charge, and changes at least one of charge density and capacitance on the surface of the molecule identification member 110, is used as an example of the molecule identification element 113. Examples of such a substance include phenylboronic acid and a derivative thereof (e.g., phenylboronic acid having a vinyl group, etc.), and a glucose-binding protein (GBP) and a derivative thereof. Other than these examples, the molecule identification element 113 is not particularly limited, as long as it can interact with an object substance. For instance, the molecule identification element 113 may be a substance, which interacts with an object substance and changes the refractive index or mass of light on the surface of the molecule identification member 110.

Furthermore, in the present embodiment, the molecule identification element 113 is added to the base material 111. The term "add" is used herein to indicate a state in which the molecule identification element 113 is fixed on the surface of the base material 111 in a certain form, or a state in which the molecule identification element 113 is present inside of the base material 111 in a certain form. Specifically, examples of the concept of the term "add" in the present embodiment include: (1) a case where the molecule identification element 113 is indirectly bound (fixed) onto the base material 111 via a certain fixing substance; (2) a case where the molecule identification member 113 directly binds to the base material 111 (for example, a case where the molecule identification member 113 is copolymerized with a polymeric monomer that is a raw material for the base material 111); and (3) a case where the molecule identification member 113 is physically adsorbed on the surface of the base material 111.

Among the specific examples described in (1) to (3) above, as in the case of (1) for example, when the base material 111 is formed from a material (e.g., a paper) that is difficult to be directly bound to the molecule identification element 113 (e.g., phenylboronic acid), the molecule identification member 110 is preferably configured to have, for example, the base material 111 that is permeable to a body fluid containing an object substance to be measured, and a fixing substance that is carried by this base material 111 and is used to fix the molecule identification element 113 on the base material 111. In this case, for example, a material that is permeable to the body fluid, such as a paper, may be used as a material for the base material 111, and a substance capable of chemically binding the molecule identification element 113 (e.g., phenylboronic acid), for example, a noble metal such as Au, Ag or Cu, may be used as a fixing substance.

Moreover, from the viewpoint of allowing the molecule identification member 110 to have flexibility, the fixing substance carried by the base material 111 preferably has a fine particle form. It is to be noted that the fine particle used herein may be a particle having a size, at which the base material 111 can maintain flexibility, when the fixing substance is carried by the base material 111 having the flexibility. For instance, a fine particle having a particle diameter of 1 μm or less can be used herein. The lower limit of the particle diameter of the fine-particle fixing substance is not particularly limited. As a practically available fixing substance, a fixing substance having a particle diameter of 10 nm or more can be used, for example.

Furthermore, the fixing substance is not particularly limited, as long as it is a substance capable of fixing (e.g., via a chemical bond) the molecule identification element 113. It is preferably a conductive material. Examples of such a conductive material include metal materials (e.g., noble metals such as Ag, Au, PT and Cu), carbon materials (e.g., carbon nanotube and graphene), polymer materials (e.g., a π-conjugated polymer), and inorganic compound materials (e.g., conductive ceramics). Thus, even in a case where an insulator (such as a paper or hydrogel) that is permeable to a body fluid is used as a base material, the molecule identification member as a whole is allowed to have conductivity by fixing the molecule identification element on the base material via a conductive material. As a result, the detection element can detect, with higher sensitivity, an electrical change generated as a result of the interaction of the object substance with the molecule identification element (e.g., a change in charge density or capacitance). Further, using a noble metal such as Au, Ag, Cu or Pt, or an oxide such as $SiO_2$, $TiO_2$ or $Al_2O_3$, it becomes easy to fix molecule identification element 113 on the surface of the base material 111.

Herein, referring to FIG. 2 and FIG. 3, fixation of the molecule identification element 113 according to the present embodiment on the surface of the base material 111 will be described. FIG. 2 is a schematic view showing a state in which the molecule identification element 113 is fixed on the surface of the base material 111. FIG. 3 is a schematic view showing a state in which the molecule identification element 113 shown in FIG. 2 is adsorbed on a fixing substance. FIG. 2 and FIG. 3 each show an example, in which phenylboronic acid reacting with glucose to generate a negative charge is used as a molecule identification element 113, a paper (cellulose fiber) is used as a base material 111, and Au is used as a fixing substance. However, the biosensor according to the present embodiment (e.g., a glucose sensor 100) is not limited to this configuration.

As shown in FIG. 2, the molecule identification member 110 has a structure in which fine particles of Au used as a fixing substance are carried by a paper consisting of cellulose fibers used as a substrate 111, and the molecule identification element 113 (which is phenylboronic acid in the example shown in FIG. 2) is adsorbed on Au. Herein, for example, phenylboronic acid is adsorbed on Au by the following mechanism. That is to say, as shown in FIG. 3, a thiol group (—SH) or a disulfide group (—S—S—) is introduced into phenylboronic acid to obtain a derivative of thiol or disulfide. It has been known that such a thiol derivative or a disulfide derivative forms a high-density thin film on the surface of a noble metal such as Au, Ag or Cu, and phenylboronic acid, into which a thiol group or the like has been introduced, forms a strong bond such as Au—S. Moreover, with regard to individual phenylboronic acids, a π-π interaction between aromatic rings functions between the adjacent phenylboronic acids. Thus, the amount of phenylboronic acid bound to Au increases, and the density also increases, so that phenylboronic acids are further integrated at a high density as a result of the π-π interaction between aromatic rings, and finally, a highly-oriented monolayer can be formed. Hence, monolayers, which are bound and integrated on the surface of a solid, and are spontaneously formed by an interacting force, such as an intermolecular force, are referred to as self-assembled monolayers (SAMs).

Herein, in the glucose sensor 100 according to the present embodiment, the following two points are considered as conditions required for forming SAMs: (A) it has a functional group that binds to a fixing substance on the surface of the base material 111; and (B) it has an intermolecular interaction whereby molecules self-assembly aggregate to form a high-density thin film. The functional group described in (A) above includes the aforementioned thiol group (—SH) and disulfide group (—S—S—). The intermolecular interaction described in (B) above includes the aforementioned π-π interaction between aromatic rings and Van der Waals force between alkyl chains. Accordingly, using the molecule identification element 113 having the above described functional group or intermolecular interaction, SAMs can be formed on the surface of the fixing substance. As a result, since the molecule identification element 113 can be present at a high density on the surface of the base material 111, even if only a trace amount of body fluid containing an object substance to be measured is present, or even if the concentration of an object substance to be measured in a body fluid is low, the glucose sensor 100 can measure the concentration of glucose with high sensitivity.

Furthermore, as shown in FIG. 2, when a polymer, such as cellulose having two adjacent hydroxyl groups, as in the case of glucose that is an object substance to be measured, is used as a base material 111, a part of a molecule identification element 113 (which is phenylboronic acid in this case) that is fixed with a fixing substance such as Au reacts with the two hydroxyl groups possessed by the cellulose according to the same mechanism as the reaction with glucose (see the after-mentioned FIG. 5), so that a bond is formed. Hence, a part of the molecule identification element 113 reacts with a polymer constituting the base material 111, so that the molecule identification element 113 can be more strongly fixed with the base material 111, and also so that the remaining molecule identification element 113 can be used in the reaction with the object substance to be measured. Such effects can be obtained more significantly, when SAMs are formed and the density of the molecule identification element 113 is high, as described above.

Further, for example, even if the aforementioned hydrogel (e.g., poly-HEMA) is used as a base material 111, or even if a paper or the like is used as a base material 111, if the molecule identification element 113 is allowed to directly bind to the base material, it is not necessary to allow the base material 111 to carry a fixing substance, differing from a case where the molecule identification element 113 is fixed on the base material 111 via the aforementioned fixing substance. It is also possible that the molecule identification element 113 such as phenylboronic acid be allowed to directly bind to hydrogel as a base material 111. In this case, for example, when the base material 111 is formed from poly-HEMA, HEMA has a vinyl bond, as shown in FIG. 4. Accordingly, using the molecule identification element 113 having a vinyl group (which is p-vinylphenylboronic acid in this example), HEMA is copolymerized with p-vinylphenylboronic acid, so that the molecule identification element 113 can be directly added to the base material 111.

Still further, the molecule identification element 113 is preferably present inside of the molecule identification member 110. Herein, examples of "the molecule identification element 113 that is present inside of the molecule identification member 110" include the following forms (1) to (3):

(1) A case where the molecule identification member 113 is incorporated into the skeleton itself of a raw material that is a matrix of the molecule identification member 110 (e.g., a raw material constituting the base material 111 in the present embodiment).

This case is, for example, a case where the raw material as a matrix is a polymer such as poly-HEMA, as with the aforementioned example shown in FIG. 4, and where a monomer constituting this polymer, such as HEMA, is copolymerized with the molecule identification element 113 such as p-vinylphenylboronic acid.

(2) A case where the molecule identification member 113 covalently binds to the raw material that is the matrix of the molecule identification member 110 (except for the case of (1) above).

This case is, for example, a case where the raw material as a matrix is a polymer such as cellulose, as with the aforementioned example shown in FIG. 2, and where a functional group possessed by this polymer (a hydroxyl group in the case of cellulose) covalently binds to a functional group possessed by the molecule identification element 113.

(3) A case where the molecule identification member 113 does not chemically bind to the raw material that is the matrix of the molecule identification member 110, but is mixed into the raw material.

As described in the aforementioned examples, when the molecule identification element 113 is present inside of the molecule identification member 110, an object substance to be measured contained in a body fluid that has permeated the molecule identification member 110 can more efficiently interact with the molecule identification element 113. In addition, since the molecule identification element 113 is not necessarily exposed on the surface of the molecule identification member 110, it is not necessary to implement a form in which the molecule identification element 113 is exposed on the surface, and thus, the form of the molecule identification member 110 has a high degree of freedom.

(Detection Element 120)

The detection element 120 is connectable with the above described molecule identification member 110, and is an element for detecting a change generated as a result of the above described interaction of the object substance with the molecule identification element 113. As such elements, semiconductor elements such as FET, light receiving elements such as photodiode and a photomultiplier tube, a thermistor, QCM (quartz crystal microbalance), and an element utilizing surface plasmon resonance can be used. In the example shown in FIG. 1, FET is used as a detection element 120, and specifically, the detection element mainly has a semiconductor substrate 125 provided with a first electrode (e.g., a source electrode 121) and a second electrode (e.g., a drain electrode 123), and an insulating film 127 as an example of the insulator according to the present embodiment.

<Semiconductor Substrate 125>

The semiconductor substrate 125 is, for example, a type p semiconductor, and a type n semiconductor portion formed by locally doping the portion thereof (for example, two portions) provided with the source electrode 121 and the drain electrode 123. That is, the FET used in the glucose sensor 100 is, what is called, n-channel type MOSFET (Metal Oxide Semiconductor Field Effect Transistor). It is to be noted that the FET used in the biosensor according to the present embodiment is not limited to the aforementioned n-channel type MOSFET (n-MOS), and it may also be p-channel type MOSFET (p-MOS), n-channel junction type FET, or p-channel junction type FET.

Moreover, the raw material for the semiconductor substrate 125 is not particularly limited. Known semiconductors, such as Si, GaAs, transparent oxide semiconductors (e.g., ITO, IGZO, and IZO), organic semiconductors, and carbon semiconductors (e.g., a carbon nanotube, a graphene semiconductor, a diamond semiconductor, etc.), can be appropriately selected and used. If a carbon semiconductor is used as a raw material for the semiconductor substrate 125, the measurement sensitivity of the glucose sensor 100 can be increased, in comparison with the case of using Si (that is, even if the concentration of an object substance in a body fluid sample is low, the measurement can be carried out with high accuracy).

<Insulating Film 127>

The insulating film 127 is placed on the surface of a portion sandwiched between the first electrode (e.g., the source electrode 121) and the second electrode (e.g., the drain electrode 123) of the semiconductor substrate 125 (which is a type p semiconductor portion in the glucose sensor 100 shown in FIG. 1), and is a film consisting of an oxide, a nitride or the like, such as $SiO_2$, $Si_3N_4$ ($SiN_x$), $Ta_2O_5$, and $Al_2O_3$.

(Measurement Principle)

Next, the measurement principle of the glucose sensor 100, in which FET is used as the detection element 120 according to the present embodiment, will be described. The molecule identification member 110 has the molecule identification element 113, and the FET used as a detection element 120 detects a potential change in the molecule identification member 110, which is generated as a result of the interaction of an object substance to be measured (for example, glucose) with the molecule identification element 113. More specifically, the object substance to be measured (for example, glucose) reacts with the molecule identification element 113 (e.g., phenylboronic acid), so that at least one of charge density and capacitance is changed in the molecule identification member 110. Then, the FET detects this change as a potential change, and thereby, the concentration of the object substance can be measured. In this case, since the molecule identification member 110 is formed from a material that is permeable to a body fluid containing the object substance, even if only a trace amount of body fluid containing an object substance can be collected, or even if the concentration of the object substance in the collected body fluid is low, the object substance that is in an amount necessary for highly accurate measurement can be reacted with the molecule identification element 113. Therefore, according to the glucose sensor 100, a measurement can be carried out with high sensitivity, using a trace amount of body fluid sample. Moreover, even in a case where a body fluid (e.g., tear, etc.) that can be collected only in a trace amount is used as a sample, according to the glucose sensor 100, since the molecule identification member 110 is formed from a material that is permeable to a body fluid containing an object substance, it becomes easy to collect a trace amount of body fluid sample.

In particular, in the case of the measurement of glucose, the concentration of glucose in the aforementioned non-invasively collectable body fluid, such as tear, sweat or saliva, is approximately one-hundredth of the glucose level in invasively collected blood, and thus, the concentration of the object substance to be measured is extremely low. Accordingly, it is difficult to measure the glucose concentration in a body fluid such as tear, sweat or saliva with high accuracy by applying a conventional enzymatic electrode method, since the sensitivity of a device applied to the enzymatic electrode method is low. On the other hand, according to the glucose sensor 100, since the molecule identification member 110 (gate base material) is formed from a material that is permeable to a body fluid, and FET with high sensitivity is used as a detection element, even if a body fluid sample having an extremely low glucose concentration, such as tear, sweat or saliva, is used, it becomes possible to carry out a measurement with high sensitivity. Moreover, in the above described enzymatic electrode method, a relatively large amount of sample is necessary for the measurement, and the measurement sensitivity is comparatively low. Thus, it is difficult to collect a body fluid such as tear or sweat in an amount necessary for the measurement according to the aforementioned method, and under the current circumstances, the invasively collected blood must be sampled for the measurement of the concentration of glucose. Furthermore, high performance liquid chromatography (HPLC) provides high measurement sensitivity. However, since the device is expensive and large-scaled, it is not suitable for intended uses, such as the daily measurement of the blood glucose level of a diabetes patient. With regard to the amount of a sample necessary for the measurement, since a large-scaled device is used, a relatively large amount of sample is necessary. On the other hand, according to the glucose sensor 100, since even a trace amount of sample can be subjected to the measurement, a body fluid such as tear or sweat can be used as a sample.

It is to be noted that the relationship between measurement sensitivity and the necessary amount of a sample in the enzymatic electrode method, HPLC, and the biosensor according to the present embodiment, is generally as shown in the following Table 1.

TABLE 1

Measurement sensitivity and necessary amount of sample in various types of measurement methods

| | Measurement sensitivity | Necessary amount of sample |
| --- | --- | --- |
| Enzymatic electrode method | Order of mM | Approximately 10 µL to 1 mL |
| HPLC | Order of µM | Approximately several tens of µL to 1 mL |
| Biosensor according to the present embodiment | Order of µM | 0.1 µL to 1 µL |

(Attachment and Detachment of Molecule Identification Member 113)

Moreover, in the glucose sensor 100, extended-gate FET is used as a detection element, as described above. Specifically, the glucose sensor 100 further comprises a metal electrode 150 on the insulating film 127, and the molecule identification member 110 is electrically connected with the insulating film 127 via the metal electrode 150, a metal wire 151, and the like. Hence, in the glucose sensor 100 using the extended-gate FET, the molecule identification member 110 is separated from the main body of FET (the semiconductor substrate 125 provided with the source electrode 121 and the drain electrode 123), and thus, it is easy to detachably connect the molecule identification member 110 with the semiconductor substrate 125. Accordingly, the molecule identification member 110 can be easily exchanged with another molecule identification member. Utilizing this, various polysaccharides, molecules complementarily specifically adsorbing on DNA, or DNAs are each fixed with the molecule identification member 110, so that various object substances can be measured only by exchanging the molecule identification member 110 with another molecule identification member. Furthermore, since the molecule identification member 110 can be separated from the main body of FET, microfabrication can be easily performed on the molecule identification member 110. Further, since it is sufficient if the molecule identification member 110 that is suitable for each object substance to be measured may only be prepared, it becomes possible to carry out the measurement at low costs. In addition, in the present embodiment, since a material that is permeable to a body fluid is used as a molecule identification member 110 that plays a role as a gate electrode, there is a fear that if the molecule identification member 110 is contacted with the main body of FET, a body fluid having permeated the molecule identification member 110 may reach the main body of FET, and that the main body of FET may not be used for a continuous measurement. In contrast, according to the glucose sensor 100 using extended-gate FET, since the molecule identification member 110 is separated from the main body of FET (namely, the detection element 120), the main body of FET can be continuously used for the measurement by exchanging only the molecule identification member 110 with another molecule identification member.

In the glucose sensor 100, the molecule identification member 110 is electrically connected with the insulating film 127 via the metal electrode 150 and the metal wire 151. The metal electrode 150 and the metal wire 151 may not be provided separately, but may be formed as an integrated product that plays the roles of both of the metal electrode 150 and the metal wire 151, to be used as a single conductive member. Alternatively, there may also be used ordinary FET, which is configured to laminate the molecule identification member 110 on the insulating film 127, without providing the metal electrode 150 and the metal wire 151 or the aforementioned conductive member.

(Others)

As shown in FIG. 1, the biosensor according to the present embodiment (e.g., the glucose sensor 100) may be provided with a reference electrode 160 as necessary. The reference electrode 160 is an electrode, which is electrically connected with the molecule identification member 110, forms a closed circuit together with the source electrode 121 and the drain electrode 123, and serves as a reference potential in the voltage measurement in FET. The reference electrode 160 may be grounded. In practical use, the reference electrode 160 is necessary upon the voltage measurement in FET. However, if it is possible to measure an object substance by another method, the reference electrode 160 may not be provided.

[Method for Producing Biosensor]

The configuration of the biosensor according to the present embodiment has been described above in detail. Next, a method for producing a biosensor having the aforementioned configuration will be described. Hereafter, the aforementioned glucose sensor 100 will be described as an example. However, other biosensors can also be produced by appropriately applying known techniques to the below-described method.

As mentioned above, the glucose sensor 100 is a biosensor in which FET is used as a detection element 120. Such a glucose sensor 100 is produced by producing a molecule identification member 110 and then incorporating the resulting molecule identification member 110 as a gate electrode portion into FET.

FET may be produced by applying a known technique, or commercially available FET may also be used.

(Method for Producing Molecule Identification Member 110)

Next, a method for producing a molecule identification member 110 will be described. Herein, a case where a molecule identification element 113 is added to a base material 111 without using a fixing substance, and a case where a molecule identification element 113 is added to a base material 111 using a fixing substance, will be described as examples.

<Case of not using Fixing Substance>

When a fixing substance is not used, for example, the molecule identification member 110 in the glucose sensor 100 according to the present embodiment consists of a mixture or a copolymer of the base material 111 consisting of a hydrophilic polymer such as hydrogel and a polymer having the molecule identification element 113 (e.g., a phenylboronic acid group), and the molecule identification member 110 can be produce by a known method.

The mixture of a hydrophilic polymer and a polymer having the molecule identification element 113 can be obtained, for example, by dissolving the hydrophilic polymer and the polymer having the molecule identification element 113 in a solvent, blending them, and drying the mixture to remove the solvent.

The hydrophilic polymer useful for production of the molecule identification member 110 of the present embodiment is not particularly limited, as long as it is permeable to a body fluid, as described above (a hydrophilic polymer having flexibility and biocompatibility is preferable), and specifically, the aforementioned raw materials can be exemplified.

Moreover, examples of the polymer having a phenylboronic acid group that is useful for production of the molecule identification member 110 of the present embodiment include polyvinylphenylboronic acid, poly(m-acrylamide-phenylboronic acid-CO—N-vinylpyrrolidone), poly-3-acrylamidephenylboronic acid, and polymethacrylamide phenylboronic acid. These substances may be used singly, or in combination of two or more thereof. Further, the polymer may also be used in the form of a copolymer with another polymer.

The solvent, in which the polymer is dissolved, is not particularly limited, and a known organic solvent can be used.

Furthermore, the copolymer of a hydrophilic polymer and a polymer having the molecule identification element 113 can also be obtained, for example, by performing radical copolymerization of a hydrophilic monomer with a monomer having the molecule identification element 113.

These copolymerized polymers are preferably hydrogel-state polymers, in terms of water absorbability and prevention of drying, etc. Such hydrogel is obtained by further adding a crosslinking monomer to the hydrophilic monomer and the monomer having the molecule identification element 113, and then performing radical copolymerization on them. The example of the crosslinking monomer is not particularly limited, and is a polyfunctional monomer having two or more unsaturated vinyl groups. A known crosslinking agent that forms a chemical cross-linkage can be used as such a crosslinking monomer. Examples of the crosslinking monomer include N,N'-methylenebisacrylamide, ethylene glycol dimethacrylate, and vinyl methacrylate.

<Case of using Fixing Substance>

When a fixing substance is used, the molecule identification member 110 in the glucose sensor 100 according to the present embodiment can be produced, for example, by allowing the base material 111 such as a paper to carry the fixing substance, and then adding the molecule identification element 113 to the fixing substance.

Substances that can be used as fixing substances are as described above. The method of allowing the base material 111 to carry the fixing substance is not particularly limited, and either physical adsorption or chemical adsorption may be applied.

In addition, as a method of adding the molecule identification element 113 to the fixing substance, a functional group capable of binding with the fixing substance is introduced into the molecule identification element 113 according to a known method, to form a derivative of the molecule identification element 113. Subsequently, this derivative is allowed to bind to the fixing substance, thereby producing a molecule identification member 110, in which the molecule identification element 113 is attached to (fixed on) the surface of the base material 111 via the fixing substance. It is to be noted that a production example, in which a paper is used as a base material 111, Au is used as a fixing substance, and phenylboronic acid is used as a molecule identification element 113, is as described above.

[Intended use and usage of Biosensor]

Next, the intended use and usage of the above described biosensor according to the present embodiment will be described, successively.

(Intended use of Biosensor)

The biosensor according to the present embodiment can be used for intended uses, such as the above described glucose sensor for measuring the concentration of glucose in a body fluid, and also, a sensor for measuring the concentration of $Na^+$ and $Cl^-$ in a body fluid (sweat, etc.) (for use in the diagnosis of Alzheimer's), a sensor for measuring an odor component in a body fluid (saliva, etc.) (for use in the diagnosis of mouth odor), and a sensor for measuring virus (e.g., influenza virus, norovirus, etc.) in a body fluid (snivel, saliva, etc.) (for use in the diagnosis of influenza, viral gastroenteritis, etc.).

(Usage of Biosensor)

Next, referring to FIG. 1, FIG. 3 and FIG. 5 again, the method of using the biosensor of the present embodiment will be described using the aforementioned glucose sensor 100 as an example. FIG. 5 is a view showing the reaction mechanism of the molecule identification element 113 according to the present embodiment with an object substance in a body fluid.

<Collection of Sample (Body Fluid)>

First of all, a body fluid that is a sample comprising an object substance to be measured (that is, herein, glucose) is collected. The body fluid usable in the glucose sensor 100 is not particularly limited. Herein, for example, since diabetes patients control their blood glucose level in a daily life, it is necessary for them to measure their blood glucose level by themselves and control the timing of injecting insulin. Under the current circumstances, an enzymatic electrode method of utilizing glucose oxidase has been widely used for the measurement of a blood glucose level. However, in the measurement according to this enzymatic electrode method, blood is used as a sample (body fluid), and collection of the blood is necessary. This blood collection poses a great burden on diabetes patients both physically and mentally, and thus, it has been desired to develop a non-invasive diagnosis, which does not pose such a burden on patients and in which a blood fluid other than blood is used. Examples of such a non-invasively collectable body fluid which can be considered may include urine, sweat, tear, and saliva. As a result of the studies conducted by the present inventors, each body fluid has the following characteristics.

Firstly, regarding urine, the timing at which sugar (glucose) is mixed into urine is after the concentration of such sugar (glucose) has become high. There may be a case where sugar (glucose) is not mixed into urine, depending on a condition such as fasting. On the other hand, there may also be case where even if the blood glucose level is normal, sugar is mixed into urine if the function of the kidney is lowered. Accordingly, since there is a possibility that the results obtained by measuring a sugar concentration using urine as a body fluid sample do not exactly reflect the sugar concentration in vivo at the time, it is considered that urine is not appropriate as a sample so much.

Secondly, regarding sweat, sugar is contained in sweat, but the concentration of sugar is approximately one-hundredth of the blood glucose level. In addition, the pH of sweat exhibits high volatility, and thus, it is difficult to always stably collect a body fluid with identical quality upon making a diagnosis. Moreover, the pH of sweat is generally in an acidic range, and thus, is out of the pH range that can be measured by the glucose sensor 100. Accordingly, upon the measurement of a sugar concentration, using sweat instead of blood, various devices are considered necessary.

Thirdly, regarding tear, tear also contains sugar, and a correlation is found between the sugar concentration in tear and a blood glucose level. Tear is a liquid component obtained by removing blood cells from the blood that has been obtained from capillary blood vessels in the tear gland, and it can be said that the tear highly reflects components in blood. Moreover, the pH of the tear is approximately 7.5 to 8.0, and this pH level is within the range that can be measured by the glucose sensor 100. However, the sugar concentration in tear is approximately one-tenth to one-hundredth of the blood glucose level, and it is considered that the measurement needs to be carried out by a highly sensitive glucose sensor.

Fourthly, saliva consists of water, electrolyte, and various types of proteins or enzymes. Saliva also contains sugar. The sugar concentration in saliva is approximately one-fiftieth to one-hundredth of the blood glucose level. The pH of saliva is generally approximately 6.8. When the amount of saliva is large, when the salivary gland is stimulated, or the like, the pH value tends to be high. The secretion amount of saliva is large, and such saliva can be relatively easily collected. On the other hand, it is difficult to avoid contamination by meals or the like. Thus, it is necessary to device a method of collecting saliva.

As stated above, sweat, tear, saliva and the like can be theoretically body fluids that can be used as samples in the glucose sensor 100. Among these body fluids, the use of tear is particularly preferable, for example, for the reasons that the tear highly reflects components in blood, that the pH of the tear is stable, and that it is easy to collect the tear.
<Reaction in Molecule Identification Member 110>

When the above described non-invasively collected body fluid permeates the molecule identification member 110, the molecule identification element 113 (e.g., phenylboronic acid) added to the molecule identification member 110 reacts with an object substance to be measured (for example, glucose) contained in a body fluid, and generates a negative charge as shown in FIG. 1 and FIG. 3. As shown in FIG. 5, this reaction mechanism is an anion type (ii), in which a hydroxide ion (OH$^-$) is oriented on the boron of phenylboronic acid (i). Glucose having two hydroxyl groups adjacent to this anion type (ii) reacts with the molecule identification element 113, so that a negative charge is generated. Herein, if phenylboronic acid binds to glucose to cause the form of boronic acid diester, pKa is largely decreased. Thus, if they are bound to each other at an appropriate pH, the ratio of the anion-type boronic acid diester becomes high, and the number of the anion types increases as a whole.
<Measurement of Object Substance>

As mentioned above, when the molecule identification element 113 (e.g., phenylboronic acid) reacts with an object substance (for example, glucose), for example, a negative charge is generated. When a charge density on the surface of the molecule identification member 110 is changed, a potential difference is generated. As a result, since the value of a potential (gate voltage) substantially given to the semiconductor substrate 125 is changed, the electric conductivity of the semiconductor substrate 125 is changed. Accordingly, when the value of a drain electric current is kept at constant, a shift in the gate voltage can be calculated, and based on a change in the gate voltage, a charge density on the molecule identification member 110 can be measured, and based on this charge density, the amount of the object substance (e.g., glucose concentration) can be calculated. That is to say, in the biosensor according to the present embodiment (e.g., a glucose sensor 100), FET detects a change in the charge density on the surface of the molecule identification member 110 as a change in the electric voltage, so as to measure the amount of an object substance.

MODIFICATION EXAMPLES

Next, modification examples of the above described glucose sensor 100 according to the present embodiment will be described.
(Modification Example Of Combination Of Molecule Identification Element With Detection Element)

As shown in Table 2 below, the aforementioned glucose sensor 100 uses phenylboronic acid (PBA), a glucose-binding protein (GBP) or the like as a molecule identification element 110, and also uses FET as a detection element 120. Herein, when PBA is used as a molecule identification element 110, a change in charge density or capacitance occurs as a change caused by the reaction of the molecule identification element with an object substance, and this change is detected as a potential change by the detection element 120. On the other hand, when GBP is used as a molecule identification element 110, a change in capacitance occurs as a change caused by the reaction of the molecule identification element with an object substance, and this change is detected as a potential change by the detection element 120.

Moreover, differing from the glucose sensor 100, in the biosensor according to the present embodiment, QCM can be used as a detection element. In this case, phenylboronic acid (PBA), a glucose-binding protein (GBP) or the like can be used as a molecule identification element 110. Furthermore, as a change caused by the reaction of the molecule identification element with an object substance, a mass change on the molecule identification member occurs, and this change is then detected as a change in the frequency by the detection element. Further, in the biosensor according to the present embodiment, an element of utilizing surface plasmon resonance can be used as a detection element. In this case, as a change caused by the reaction of the molecule identification element with an object substance, a change in the refractive index of light irradiated to the molecule identification member occurs, and this change is detected as a change in a refraction angle by the detection element.

TABLE 2

Combination of molecule identification element with detection element

| Molecule identification element | PBA | GBP PBA | GBP PBA | GBP PBA |
|---|---|---|---|---|
| Detection element | FET | FET | QCM | Surface plasmon resonance |
| Change caused by reaction of molecule identification element with object substance | Charge density | Capacitance | Mass | Refractive index |
| Change detected by detection element | Potential | Potential | Frequency | Refraction angle |

(Modification Example Of Form Of Molecule Identification Member)

Next, referring to FIG. 6, a modification example of the form of the molecule identification member will be described. FIG. 6 is a schematic view showing a configuration of a modification example of the biosensor according to the present embodiment.

FIG. 6 shows a swab-type glucose sensor 200 as a biosensor according to the present modification example. The glucose sensor 200 mainly comprises a molecule identification member 210, a semiconductor element 220, and a metal wire 230.

<Molecule Identification Member 210>

The molecule identification member 210 is similar to the aforementioned molecule identification member 110, in terms of the material thereof and it has a molecule identification element (which is not shown in the figure). The molecule identification member 210 has a structure that is particularly suitable for a case where tear is collected as a body fluid used as a sample. Specifically, the molecule identification member 210 has a shape similar to the cotton portion of a cotton swab (e.g., a substantially spherical shape or a substantially elliptical spherical shape), and also has flexibility and biocompatibility, and is formed from a soft material (e.g., the aforementioned hydrogel, etc.). Therefore, according to the molecule identification member 210, a trace amount of tear liquid can be collected without damaging an eyeball or the skin surrounding the eyeball.

<Semiconductor Element 220>

The semiconductor element 220 functions as (at least a portion of) the detection element according to the present modification example, and detects a change in charge density that depends on the concentration of an object substance to be measured (e.g., glucose) in a body fluid (e.g., a tear liquid). Specifically, this semiconductor element 220 corresponds to a configuration of the aforementioned detection element 120, which comprises a semiconductor substrate 125 in which a source electrode 121 and a drain electrode 123 are formed, an insulating film 127, and a metal electrode 150.

<Metal Wire 230>

The metal wire 230 electrically connects the molecule identification member 210 with the semiconductor element 220. Thereby, an interaction (e.g., a chemical reaction) occurs between a molecule identification element present in the molecule identification member 210 and an object substance to be measured, and thereafter, a change in charge density (e.g., generation of a negative charge) generated in the molecule identification member 210 as a result of the interaction can be detected by the semiconductor element 220 through the metal wire 230.

Upon the actual measurement, after a body fluid such as a tear liquid has been collected by the glucose sensor 200, the glucose sensor 200 is connected with an external device capable of forming a circuit with the semiconductor element 220, such as a measuring device. Thereby, for example, a change in charge density that depends on the concentration of an object substance to be measured (for example, glucose) in a body fluid (e.g., a tear liquid) can be detected as a potential change.

<Preferred Aspects>

Among the above described aspects, the following aspects are preferable.

Preferred aspect (1) is a biosensor for measuring an object substance contained in a body fluid, comprising:

a molecule identification member having a base material that is permeable to the body fluid, and a molecule identification element that is fixed on the base material and can interact with the object substance contained in the body fluid having permeated the base material; and a detection element that is connectable with the molecule identification member and detects a change generated as a result of the interaction, wherein the molecule identification element binds to a conductive material (e.g., a noble metal) dispersed in and carried by the base material, to thereby be fixed on the base material, the detection element has a semiconductor substrate provided with a first electrode and a second electrode, and an insulator placed on the surface of a portion sandwiched between the first electrode and the second electrode of the semiconductor substrate, and the molecule identification member is connected with the semiconductor substrate via the insulator.

Preferred aspect (2) is the biosensor of the preferred aspect (1), wherein the molecule identification member further has at least one of flexibility and biocompatibility.

Preferred aspect (3) is the biosensor of the preferred aspect (1) or (2), wherein the molecule identification element is present inside of the molecule identification member.

Preferred aspect (4) is the biosensor of any one of the preferred aspects (1) to (3), wherein the molecule identification member is detachably connected with the detection element.

Preferred aspect (5) is the biosensor of any one of the preferred aspects (1) to (4), wherein the molecule identification element is a substance that reacts with the object substance to change at least one of charge density and capacitance in the molecule identification member, the detection element detects, as a potential change, a change in at least one of charge density and capacitance in the molecule identification member, and the object substance is quantified based on the potential change detected by the detection element.

Preferred aspect (6) is the biosensor of any one of the preferred aspects (1) to (5), wherein the object substance is glucose.

Preferred aspect (7) is the biosensor of the preferred aspect (6), wherein the molecule identification element is phenylboronic acid, a glucose-binding protein (GBP), or a derivative thereof.

Preferred aspect (8) is the biosensor of any one of the preferred aspects (1) to (7), wherein the body fluid is tear, sweat, saliva, or snivel.

Preferred aspect (9) is the biosensor of any one of the preferred aspects (1) to (8), wherein the insulator is an insulating film placed on the surface of a portion sandwiched between the first electrode and the second electrode of the semiconductor substrate.

Preferred aspect (10) is the biosensor of the preferred aspect (9), which further comprises a metal electrode, and a metal wire connecting the metal electrode with the molecule identification member, on the insulating film, wherein the molecule identification member is connected with the insulating film via the metal electrode and the metal wire.

Preferred aspect (11) is the biosensor of the preferred aspect (9), which further comprises a conductive member on the insulating film, wherein the molecule identification member is connected with the insulating film via the conductive member.

Preferred aspect (12) is the biosensor of the preferred aspect (9), wherein the molecule identification member is laminated on the insulating film.

Preferred aspect (13) is a molecule identification member, which comprises a base material that is permeable to a body fluid, and a molecule identification element that is fixed on the base material and can interact with an object substance contained in the body fluid having permeated the base material, and which is used to connect with a detection element for detecting a change generated as a result of the interaction, wherein the molecule identification element binds to a conductive material (e.g., a noble metal) dispersed in and carried by the base material, to thereby be fixed on the base material, the detection element has a semiconductor substrate provided with a first electrode and a second electrode, and an insulator placed on the surface of a portion sandwiched between the first electrode and the second electrode of the semiconductor substrate, and the molecule identification member is detachably connectable with the semiconductor substrate via the insulator.

Preferred aspect (14) is the molecule identification member of the preferred aspect (13) further having at least one of flexibility and biocompatibility.

Preferred aspect (15) is the molecule identification member of the preferred aspect (13) or (14), wherein the molecule identification element is present inside of the molecule identification member.

Preferred aspect (16) is the molecule identification member of any one of the preferred aspects (13) to (15), wherein the molecule identification element is a substance that reacts with the object substance to change at least one of charge density and capacitance in the molecule identification member.

Preferred aspect (17) is the molecule identification member of any one of the preferred aspects (13) to (16), wherein the object substance is glucose.

Preferred aspect (18) is the molecule identification member of the preferred aspect (17), wherein the molecule identification element is phenylboronic acid, a glucose-binding protein (GBP), or a derivative thereof.

Preferred aspect (19) is the molecule identification member of any one of the preferred aspects (13) to (18), wherein the body fluid is tear, sweat, saliva, or snivel.

Preferred aspect (20) is the molecule identification member of any one of the preferred aspects (13) to (19), used in a biosensor for measuring the object substance contained in the body fluid.

EXAMPLES

Hereinafter, the present invention will be more specifically described in the following example and comparative example. However, these examples are not intended to limit the scope of the present invention.

In the present example, gel prepared by copolymerizing hydroxyethyl methacrylate (HEMA) with vinylphenylboronic acid was used as a molecule identification member (namely, phenylboronic acid was used as a molecule identification element), a semiconductor element (MOSFET) was used as a detection element, a glucose solution that imitated a body fluid was used as a sample, and glucose concentration responsiveness was evaluated. Specifically, evaluation was carried out as follows.

(Production of Glucose Sensor)

In the present example, using MOSFET as a detection element, an extended-gate-type gate electrode portion was produced as follows. First, 3.8 g of hydroxyethyl methacrylate (HEMA), 0.2 g of vinylphenylboronic acid, and 0.02 g of N,N'-methylenebisacrylamide were dissolved in 10 ml of ultrapure water, and they were then blended. Thereafter, 5 mg of potassium peroxydisulfate (manufactured by Wako Pure Chemical Industries, Ltd.) used as a polymerization initiator, and 5 μl of tetramethylenediamine (manufactured by Tokyo Chemical Industry Co., Ltd.) were added to the mixture, to thereby initiate polymerization. Regarding polymerization conditions, HEMA was copolymerized with vinylphenylboronic acid under a nitrogen atmosphere at a room temperature for 24 hours. After completion of the polymerization reaction, a solution containing a copolymer was immersed in ultrapure water, so as to remove an unreacted monomer, thereby obtaining a gelatinous molecule identification member, in which HEMA was copolymerized with vinylphenylboronic acid.

Subsequently, in the present example, in order to carry out a measurement in a solution, a glass ring having an outer diameter of 12 mm, an inner diameter of 10 mm, and a height of 10 mm was fixed on the above-obtained molecule identification member, using an epoxy resin. It is to be noted that a solution with a volume of approximately 800 μl at maximum can be placed in this glass ring.

The molecule identification member, on which the above-produced glass ring was fixed, was electrically connected as an extended-gate-type gate electrode portion with MOSFET, so as to produce the glucose sensor of the present example.

(Method for Evaluating Glucose Concentration Responsiveness)

Using the above-produced glucose sensor, glucose concentration responsiveness was evaluated as follows. First, glucose was dissolved in PBS (phosphate buffered saline), so that glucose solutions (each 400 μl) having glucose concentrations of 0.001 mM, 0.01 mM, 0.1 mM, 1 mM and 10 mM were prepared.

Subsequently, only PBS was placed into the glass ring of the above described glucose sensor, and a Vg-Id property was measured using a semiconductor parameter analyzer (manufactured by Agilent), so that a change in Vg at a constant current (Id =2 mA) (namely, the surface potential of the molecule identification member) was measured. The measuring temperature was a room temperature, the pH applied upon the measurement was 7.4, and thus, conditions were kept at almost constant. As a reference electrode, a silver-silver chloride (Ag/AgCl) electrode was used.

(Evaluation Results of Glucose Concentration Responsiveness)

The results of the aforementioned measurement are shown in FIG. 7. FIG. 7 is a graph showing the results obtained by evaluating the glucose concentration responsiveness of the biosensor according to the example of the present invention. The longitudinal axis of FIG. 7 indicates a change in the surface potential (mV) of the molecule identification member, and the horizontal axis thereof indicates the concentration of glucose (mM).

As shown in FIG. 7, when the glucose concentration was in the range of 0.001 mM to 10 mM, a change in the surface potential was detected, and thus, it was found that the measurement can be carried out with sufficient sensitivity in any concentration. Moreover, from the results shown in FIG. 7, it was found that there is a linear relationship between the glucose concentration and a change in the surface potential Vg, and that the glucose concentration can be quantitatively measured using the glucose sensor of the present example.

As above, referring to the drawings, the preferred embodiments of the present invention have been described. However, the aforementioned embodiments are not intended to limit the scope of the present invention. That is to say, it is understood that other embodiments that could be achieved by a person skilled in the art in the scope of the invention recited in the claims, or various modification examples, are also included in the technical scope of the present invention.

REFERENCE SIGNS LIST 100, 200 Glucose sensor
110, 210 Molecule identification member
111 Base material
113 Molecule identification element
120 Detection element
121 Source electrode
123 Drain electrode
125 Semiconductor substrate
127 Insulating film
150 Metal electrode
151, 230 Metal wire
160 Reference electrode
220 Semiconductor element

The invention claimed is:

1. A biosensor for measuring an object substance contained in a body fluid, comprising:
a molecule identification member comprising a base material which is permeable to the body fluid, and a molecule identification element which is fixed on the surface of the base material and can interact with the object substance contained in the body fluid permeated in the base material, wherein a raw material of the base material is selected from the group consisting of hydrophilic polymer, silica, water-absorbable rubber, water absorbable foamed plastic, cotton, non-woven fabric, woven fabric, and fiber, wherein the molecule identification element is indirectly bound via a fixing substance to and/or absorbed on the surface of the base material; and
a detection element which is connectable with the molecule identification member, and detects a change generated as a result of the interaction,
wherein the detection element has a semiconductor substrate provided with a first electrode and a second electrode; and an insulator placed on the surface of a portion sandwiched between the first electrode and the second electrode of the semiconductor substrate, and the molecule identification member is connected with the semiconductor substrate via the insulator,
wherein the molecule identification element is not covalently attached to the insulator and wherein the molecule identification member is not disposed onto an electrode, and
wherein the molecule identification element is present inside of the molecule identification member.

2. The biosensor according to claim 1, wherein the molecule identification member further has at least one of flexibility and biocompatibility.

3. The biosensor according to claim 1, wherein the molecule identification member is detachably connected with the detection element.

4. The biosensor according to claim 1, wherein
the molecule identification element is a substance which reacts with the object substance to change at least one of charge density and capacitance in the molecule identification member,
the detection element detects, as a potential change, a change in at least one of the charge density and the capacitance in the molecule identification member, and
based on the potential change detected by the detection element, the object substance is quantified.

5. The biosensor according to claim 1, wherein the object substance is glucose.

6. The biosensor according to claim 5, wherein the molecule identification element is a phenylboronic acid, a glucose-binding protein (GBP) or a derivative thereof.

7. The biosensor according to claim 1, wherein the body fluid is tear, sweat, saliva or nasal discharge.

8. A molecule identification member comprising a base material which is permeable to a body fluid and a molecule identification element which is fixed on the surface of the base material and can interact with an object substance contained in the body fluid permeated in the base material, wherein a raw material of the base material is selected from the group consisting of hydrophilic polymer, silica, water-absorbable rubber, water absorbable foamed plastic, cotton, non-woven fabric, woven fabric, and fiber, wherein the molecule identification element is indirectly bound via a fixing substance to and/or physically absorbed on the surface of the base material, and
wherein the molecule identification member is connectable with a detection element that detects a change generated as a result of the interaction,
wherein the detection element has a semiconductor substrate provided with a first electrode and a second electrode; and an insulator placed on the surface of a portion sandwiched between the first electrode and the second electrode of the semiconductor substrate, and the molecule identification member is connected with the semiconductor substrate via the insulator,
wherein the molecule identification element is not covalently attached to the insulator and wherein the molecule identification member is not disposed onto an electrode, and
wherein the molecule identification element is present inside of the molecule identification member.

9. The molecule identification member according to claim 8, which further has at least one of flexibility and biocompatibility.

10. The molecule identification member according to claim 8, wherein the molecule identification element is a substance which reacts with the object substance to change at least one of charge density and capacitance in the molecule identification member.

11. The molecule identification member according to claim 8, wherein the object substance is glucose.

12. The molecule identification member according to claim 11, wherein the molecule identification element is a phenylboronic acid, a glucose-binding protein (GBP) or a derivative thereof.

13. The molecule identification member according to claim 8, wherein the body fluid is tear, sweat, saliva or nasal discharge.

14. A method for measuring an object substance contained in body fluid, the method comprising using a biosensor comprising the molecule identification member according to claim 8.

* * * * *